United States Patent [19]

Gaiser et al.

[11] Patent Number: 4,843,820

[45] Date of Patent: Jul. 4, 1989

[54] BRAKE SYSTEM IN-LINE FAST FILL VALVE

[75] Inventors: Robert F. Gaiser, Stevensville, Mich.; Donald A. Crumb, Granger, Ind.

[73] Assignee: Allied-Signal Inc., Morristown, N.J.

[21] Appl. No.: 187,720

[22] Filed: Apr. 29, 1988

[51] Int. Cl.[4] .............................................. F15B 7/00
[52] U.S. Cl. ......................................... 60/585; 60/591
[58] Field of Search ................ 60/583, 585, 588, 589, 60/591, 533; 417/385, 388

[56] References Cited

U.S. PATENT DOCUMENTS

| | | | |
|---|---|---|---|
| 3,147,046 | 9/1964 | Stelzer | 60/591 X |
| 3,163,473 | 12/1964 | Stelzer | 60/591 X |
| 3,473,849 | 10/1969 | Smith et al. | 60/591 X |
| 3,547,498 | 12/1970 | Bueler | 60/591 X |

Primary Examiner—Edward K. Look
Attorney, Agent, or Firm—Larry J. Palguta; Ken C. Decker

[57] ABSTRACT

The brake system in-line fast fill valve (10) of the present invention comprises a valve housing (12) which may be threadably inserted within the body of a master cylinder so that an inlet (28) at one end of the fast fill valve (10) communicates with an outlet (39) from a pressure chamber (33) of the master cylinder (30). The valve housing (12) includes a stepped bore (22) having a differential area fast fill piston (40) receiving slidably therein a poppet piston (60). A first seal (50) is disposed about a reduced diameter portion (46) of the fast fill piston (40) and axially opposite a second seal (52) disposed at an enlarged diameter end (48) of the fast fill piston (40). The second seal (52) is received about a second radially enlarged end (62) of the poppet piston (60), the poppet piston (60) extending through the fast fill piston (40) and an end opening (44) within the fast fill piston (40), with a third seal (56) disposed about a first poppet end (66) and abutting a reduced diameter end (42) of the fast fill piston (40). A first spring (72) biases the poppet piston (60) into engagement with the fast fill piston (40), and a second spring (74) extends between a second radially enlarged end (68) of the poppet piston (60) and a radial wall (23) of said stepped bore (22). The enlarged ends (48, 68) of the pistons (40, 60) are disposed within a fast fill chamber (24) which communicates with an outlet (20) of the fast fill valve housing (12). The fast fill valve (10) effects a quick transmittal of fluid to a brake piston, and effects a slight delay in the transmission of higher pressure to the brake so that the fast fill valve (10) function as a hold-off valve.

35 Claims, 1 Drawing Sheet

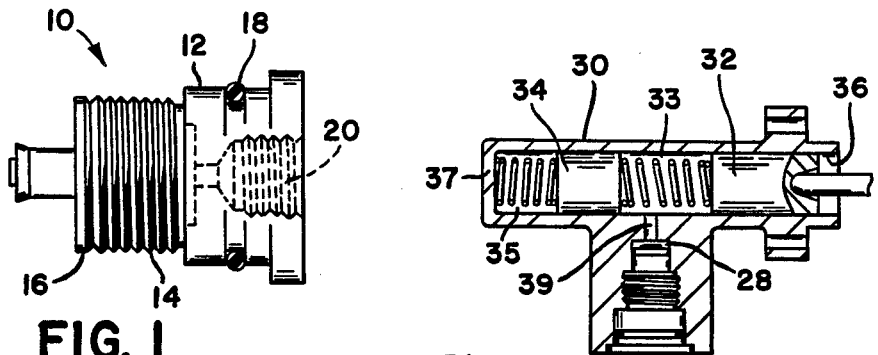
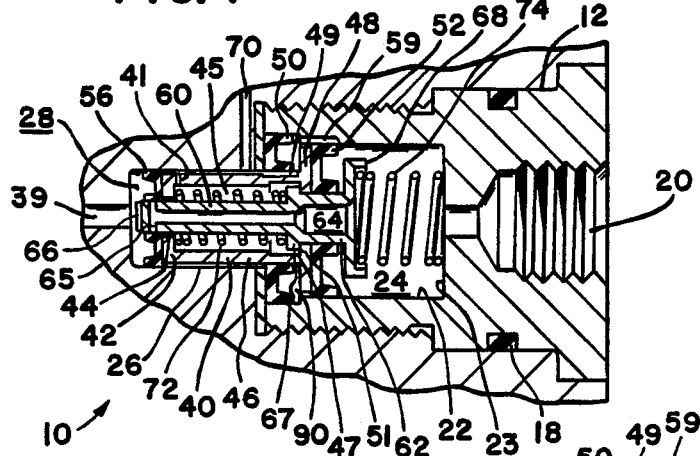
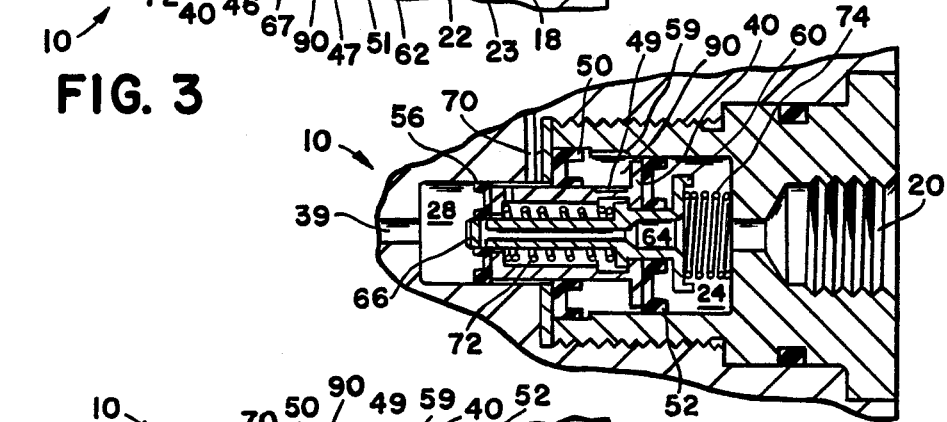
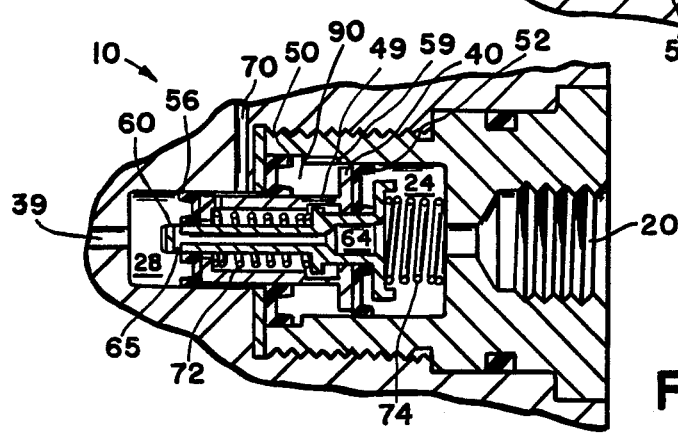

BRAKE SYSTEM IN-LINE FAST FILL VALVE

The present invention comprises a brake system in-line fast fill valve, in particular a fast fill valve which may be threadably inserted within an opening of an master cylinder.

In order to ensure that the pistons of disc brakes retract properly from the friction elements so that the elements move away from the rotor and effect a proper running clearance, a number of mechanisms have been provided, such as retraction seals about the piston of the disc brake. With the advent of disc brake retraction, there is produced a high brake pedal travel that is required in order to provide the displacement of brake fluid necessary to extend the disc brake pistons and effect contact between the friction elements and rotor. In order to provide the necessary fluid displacement, fast fill mechanisms have been incorporated in master cylinders in order to place quickly in operational position the disc brake pistons. This results in a reduction of brake pedal travel, which provides an improved initial pedal feel during nominal brake fluid application rates. However, distinct disadvantages are evident when typical prior fast fill mechanisms are utilized. Present state of the art fast fill mechanisms are provided by using a dual or stepped diameter primary piston. One diameter, the smaller of the two, is generally the same as the diameter of the master cylinder bore and secondary piston. The larger diameter is used to provide additional displacement of brake fluid to the brake system by directing this fluid into the primary chamber. At a predetermined fast fill chamber pressure, brake fluid is directed to the reservoir via the relief valve. During a slow rate of brake application, insufficient fluid displacement is provided due to the inherent brake fluid leakage from the fast fill chamber to the reservoir. During a high rate of brake application, a high pedal force is experienced due to rapid primary and fast fill chamber initial pressures which are reacted onto the effective diameters of the master cylinder primary piston. When the fast fill fluid pressure is "dumped" to the reservoir via an integral relief valve, reduced pedal effort follows and this results in an undesirable transition pedal feel with relatively poor modulation.

The present invention provides a brake system in-line fast fill valve which may be utilized with a conventional master cylinder or with a recessed cartridge master cylinder such is that generally illustrated in U.S. Pat. No. 4,718,234, and may utilize a fast fill valve that may be threadably inserted at the master cylinder primary chamber outlet port. A differential diameter piston within the fast fill valve provides the increased fluid displacement during initial master cylinder stroke or displacement of the pistons therein. At a predetermined pressure, the fast fill valve then allows direct pressure flow from the master cylinder to the brake system. The present invention comprises a valve housing having therein a stepped bore, a first bore end having an inlet receiving fluid pressure and a second bore end having a fluid pressure outlet, a differential area piston having a first reduced diameter end extending into the first bore end and a second enlarged diameter end extending into the second bore end, the piston having a through opening, the second enlarged diameter end of the piston having first and second seals disposed thereat, an area between said seals comprising a variable volume chamber, a poppet piston received in the through opening, the poppet piston having an aperture providing fluid flow therethrough, a first poppet end at an end opening in the reduced diameter end of the fast fill piston, and a second end at said second enlarged diameter end of the fast fill piston, first resilient means disposed between the pistons, and second resilient means disposed between the poppet piston and valve housing, wherein fluid pressure received at said inlet effects lateral movement of said pistons and a change in the volume of the variable volume chamber defined between said seals.

One way of carrying out the invention is described in detail below with reference to the drawings which illustrate an embodiment in which:

FIG. 1 is a plan view of the fast fill valve housing;

FIG. 2 is a schematic illustration of the fast fill valve housing attached to a master cylinder; and FIGS. 3-5 are section views of the fast fill valve commencing at the rest position in FIG. 3 and progressing through stages of operation.

The fast fill valve of the present invention is indicated generally by reference numeral 10 in FIG. 1. Fast fill valve 10 comprises a fast fill valve housing 12 which includes threads 14 adjacent a first end 16. A seal 18 is disposed about the circumference of housing 12. Located within valve housing 12 is an outlet 20 which communicates with an enlarged diameter bore section or fast fill chamber 24 of stepped diameter bore 22 (see FIG. 3). Fast fill housing 12 may be threadably inserted into an outlet opening of a master cylinder. It should be clearly understood that the fast fill valve of the present invention may be connected to either the primary or secondary pressure chambers of a master cylinder, depending on the particular application desired for the valve. For exemplary purposes, fast fill valve 120 is described in relation to the primary presure chamber 33 of a master cylinder 30 illustrated in FIG. 2. Master cylinder 30 (reservoir not shown) includes typically a primary piston 32 and a secondary piston 34 received within bore 36, the primary pressure chamber 33 defined between the pistons and a secondary pressure chamber 35 defined between the secondary piston 34 and master cylinder housing end 37. The primary pressure chamber includes an outlet 39 which communicates with an inlet 28 of valve 10.

Stepped bore 22 of valve 10 comprises the enlarged diameter bore section 24 and a reduced diameter bore section 26. Valve 10 includes the inlet 28 which communicates with the outlet 39 of master cylinder 30. Disposed within stepped bore 22 is a differential area fast fill piston 40 and a poppet piston 60. The fast fill piston 40 comprises a first reduced diameter end 42 having an end opening 44. A first seal 50 is disposed about a reduced diameter portion 46 and aligned with compensation grooves 49 of piston 40. Piston 40 includes a second enlarged diameter end 48 which abuts a second seal 52, and a longitudinal through opening 45 which enlarges at the second enlarged diameter end 48 to include a recess 47. Second enlarged diameter end 48 extends radially inwardly to provide abutment 51. Fast fill piston 40 includes a vent 41 which permits the interior of piston 40 to communicate with a reservoir passage 70. First seal 50 engages sealably a surface of enlarged diameter bore section 24, as does second seal 52. However, second seal 52 is aligned with compensation grooves 59 disposed within the surface of bore section 24. Second seal 52 is disposed sealingly and slidably about a second radially enlarged end 62 of poppet piston 60 which includes an aperture 64 that communicates with a transverse aperture 65 at the first poppet end 66. First poppet end 66 of piston 60 extends through end opening 44 of piston 40, and is slidably and sealingly engaged by a third seal 56 which engages the surface of reduced diameter bore section 26. Poppet piston 60 includes an abutment 67 which provides seating for a first spring or resilient means 72 which also abuts the first reduced diameter end 42 of piston 40. Abutment 67 is biased by spring 72 into engagement with abutment 51 of piston 40. Poppet piston 60 includes a second radially enlarged end 68 which is engaged by second resilient means or spring 74 that engages wall 23 of stepped bore 22 in order to bias poppet piston 60 toward seals 50, 52.

An area between seals 50 and 52 further defined by the surface of stepped bore 22 and the exterior of piston 40 comprises a variable volume chamber 90. As fast fill piston 40 moves toward the outlet 20, variable volume chamber 90 defined between seals 50 and 52 will increase in size.

When fast fill valve 10 is in the at-rest position illustrated in FIG. 3, compensation grooves 49 and 59 are open so that any pressure within outlet 20 and fast fill chamber 24 may be communicated through the compensation grooves to reservoir passage 70. Any fluid pressure present at outlet 39 is communicated to the reservoir via the compensation opening (not shown) which is typically present within the associated pressure chamber of the master cylinder. When the brakes of the vehicle are applied by depressing the brake pedal, a pressure from an associated pressure chamber is communicated through outlet 39 to first ends 66 and 42 of the pistons 60 and 40.

The pressure at inlet 39 overcomes the spring force of second resilient means 74 and the seal friction of seals 50, 52 and 56, whereby fast fill piston 40 and poppet piston 60 move simultaneously to the right of FIG. 3 and into fast fill chamber 24, which effects the displacement of brake fluid from fast fill chamber 24 through outlet 20 and to the associated brakes. As a result of the initial fluid pressure at outlet 39 causing the displacement of a large volume of brake fluid from fast fill chamber 24 to the associated brakes, the stroke of the associated piston within the master cylinder will be reduced which results in a correspondingly reduced stroke of the brake pedal. As pistons 60 and 40 move to the position illustrated in FIG. 4, the size of variable volume chamber 90 increases and fluid therein is replenished by being drawn through reservoir passage 70, past the inside diameter of seal 50, and into variable volume chamber 90. When pistons 40 and 60 move to the right to the displaced positions illustrated in FIG. 4, seal 50 remains stationary and fast fill piston 40 moves compensation grooves 49 out of alignment with seal 50 so that fluid may not flow backwardly toward reservoir passage 70. Simultaneously, second seal 52 is moved from axial alignment with compensation grooves 59. This effects the build up of pressure within the fast fill chamber 24. When the fluid pressure within fast fill chamber 24 exceeds the pressure at outlet 39 times the effective area of poppet piston 60 plus the spring force of first spring 72, poppet piston 60 will shift to the left with respect to fast fill piston 40, as illustrated in FIG. 5. This causes transverse opening 65 to extend beyond the lip of seal 56 and communicate with inlet 39. Thus, aperture 64 of poppet 60 now provides communication between outlet 39 and outlet 20, so that increased pressure received at outlet 39 is communicated to fast fill chamber 24, outlet 20, and the associated brakes. Fast fill piston 40 will not move to the left in FIG. 5 because as pressure builds within fast fill chamber 24 as a result of the communication of increased fluid pressure from outlet 39 via aperture 64, leftward movement of piston 40 is resisted by the fluid pressure contained with variable volume chamber 90. When the brake application is terminated and brake pressure begins to recede at outlet 39, the fluid pressure within fast fill chamber 24 will immediately decrease because fluid may flow thorugh aperture 64, transverse opening 65, through outlet 39 and back to the master cylinder. As the pressure at outlet 20 and within fast fill chamber 24 decreases to the point that poppet piston 60 moves toward the right relative to fast fill piston 40. As the pressure at outlet 39 decreases, both pistons move simultaneously back toward an at rest position, and the presure within variable volume chamber 90 will decrease to the pressure within fast fill chamber 24 as fluid in chamber 90 moves around the exterior diameter lip of seal 52 and into chamber 24. This permits fast fill piston 40 to return toward the at-rest position where seals 50 and 52 are aligned with respective compensation grooves 49 and 59 so that all pressures return to essentially zero at the full release position, and valve 10 is in its at-rest position as illustrated in FIG. 3. Fast fill valve 10 may be altered according to the desired output pressure desired at outlet 20. For example, by reducing the friction between seals 52 and 56 and poppet piston 60 and altering the spring force of second resilient means 74, the pressure required at outlet 39 in order to effect an outlet pressure at outlet 20 may be altered accordingly.

The above described invention provides substantial advantages over prior fast fill valve mechanisms. First, fast fill valve 10 results in no increased brake pedal effort required by the driver of the vehicle. There is provided a positive fast fill fluid displacement output which is less brake application rate sensitive. Minimal master cylinder modification is required, the fast fill valve being adaptable to conventional and recessed cartridge master cylinders. The valve housing may be threaded so that it is a module that is screwed into the threaded opening of a master cylinder outlet port. The fast fill valve provides improved transition pedal feel, and is adaptable for axle-axle split vehicles which utilize front hold-off metering valves. The fast fill valve of the present invention, when utilized with a primary pressure chamber of a master cylinder and connected to the front brakes of a vehicle, provides a front hold-off pressure. In other words, when the vehicle driver applies the brakes, the pressure at outlet 39 effects the fast fill function, and while the fast fill function of valve 10 is being accomplished, a brake pressure is being applied to the rear brakes. Thus, there is a delay or slight lag time between the actual application of higher pressure to the front brakes as compared to the rear brakes. By allowing the rear brakes to be applied slightly earlier, the vehicle is kept from "nose diving" forward which typically can happen when the front disc brakes grab ahold of the rotors. Thus, the fast fill function provided by valve 10 provides a front hold-off pressure which provides for a more stable orientation of the vehicle during braking.

Furthermore, it is contemplated that one skilled in the art could make many modifications and/or changes to the invention as described herein without deviation from the essence thereof. As such these modifications and/or changes are intended to fall within the scope of the appended claims.

We claim:

1. A fast fill valve, comprising a valve housing having therein a stepped bore, the valve having a first bore end with an inlet receiving fluid pressure and a second bore end having a fluid pressure outlet, a fast fill piston having a first reduced diameter end extending into the first bore end and a second enlarged diameter end extending into the second bore end, the fast fill piston having a longitudinal through opening, the second enlarged diameter end of the fast fill piston having first and second seals disposed on opposite sides thereof, an area between said seals comprising a variable volume chamber, a poppet piston received in the longitudinal through opening, the poppet piston including an aperture providing fluid flow therethrough, a first poppet end which extends through an end opening in the reduced diameter end of the fast fill piston, and a second radially enlarged end at said second enlarged diameter end of the fast fill piston, first resilient means disposed between the pistons and biasing said poppet piston toward the enlarged diameter end of the fast fill piston, and second resilient means disposed between the poppet piston and valve housing, wherein fluid pressure received at said inlet effects lateral movement of said pistons and a change in the volume of the variable volume chamber defined between said seals.

2. The fast fill valve in accordance with claim 1, wherein the fast fill piston includes compensation grooves disposed adjacent a radially interior part of said first seal.

3. The fast fill valve in accordance with claim 2, wherein the valve housing includes compensation grooves aligned with a radially peripheral portion of said second seal.

4. The fast fill valve in accordance with claim 3, wherein the fast fill piston and poppet piston include a recess and radially extending abutment, the radially extending abutment received within the recess in order to capture the poppet piston within the fast fill piston.

5. The fast fill valve in accordance with the claim 4, wherein said radially extending abutment defines a shoulder engaged by said first resilient means.

6. The fast fill valve in accordance with claim 5, further comprising a third seal disposed at the first reduced diameter end of the fast fill piston and about the first poppet end, the third seal effecting closure of said aperture when said poppet piston is in an at rest position.

7. The fast fill valve in accordance with claim 6, wherein the valve comprises a second outlet communicating with a low pressure reservoir, and the fast fill piston includes a vent permitting fluid between the poppet piston and fast fill piston to communicate therethrough.

8. The fast fill valve in accordance with claim 7, wherein the valve housing is received within an outlet opening of a master cylinder.

9. The fast fill valve in accordance with claim 8, wherein the outlet opening includes the first bore end.

10. The fast fill valve in accordance with claim 9, wherein the inlet communicates with a primary pressure chamber in said master cylinder.

11. The fast fill valve in accordance with claim 10, wherein the second seal is received slidably and sealingly about the poppet piston.

12. The fast fill valve in accordance with claim 11, wherein the second enlarged diameter end of the fast fill piston and the second radially enlarged end of the poppet piston are disposed within a fast fill chamber which communicates with said fluid pressure outlet.

13. The fast fill valve in accordance with claim 12, wherein the valve housing includes a seal thereabout which engages a surface of said outlet opening of the master cylinder.

14. The fast fill valve in accordance with claim 13, wherein the valve housing is received threadably by a threaded portion of said outlet opening of the master cylinder.

15. A fast fill valve, comprising a valve housing having a stepped bore, the valve having a first bore end with an inlet receiving fluid presure and a second bore end having a fluid pressure outlet, a differential area piston having a first reduced diameter end extending into the first bore end and a second enlarged diameter end extending into the second bore end, the piston having a through opening, the second enlarged diameter end of the piston having first and second seals disposed thereat, an area between said seals comprising a variable volume chamber, a poppet piston received in the through opening, the poppet piston including an aperture providing fluid flow therthrough, a first poppet end at an end opening in the reduced diameter end of the fast fill piston, and a second end at said second enlarged diameter end of the fast fill piston, first resilient means disposed between the pistons, and second resilient means disposed between the poppet piston and valve housing, wherein fluid presure received at said inlet effects lateral movement of said pistons and a change in the volume of the variable volume chamber defined between said seals.

16. The fast fill valve in accordance with claim 15, wherein the first resilient means biases the pistons into abutment with one another.

17. The fast fill valve in accordance with claim 15, further comprising a third seal disposed at the first reduced diameter end of the differential area piston and about the first poppet end, the third seal effectng closure of said aperture when said poppet piston is in an at-rest position.

18. The fast fill valve in accordance with claim 15, wherein the second seal is received slidably and sealingly about the poppet piston.

19. The fast fill valve in accordance with claim 15, wherein the valve comprises a second outlet communicating with a low pressure reservoir, and the differential area piston includes a vent permitting fluid between the poppet piston and differential area piston to communicate therethrough.

20. The fast fill valve in accordance with claim 15, wherein the valve housing includes compensation grooves aligned with a radially peripheral portion of said second seal.

21. The fast fill valve in accordance with claim 15, wherein the valve housing is received within an outlet opening of a master cylinder, the outlet opening defining the first bore end.

22. The fast fill valve in accordance with claim 21, wherein the fast fill valve housing is received threadably by a threaded portion of said outlet opening of the master cylinder.

23. The fast fill valve in accordance with claim 22, wherein the fast fill valve housing includes a seal thereabout which engages a surface of said outlet opening of the master cylinder.

24. The fast fill valve in accordance with claim 15, wherein the differential area piston and poppet piston include a recess and a radially extending abutment, the radially extending abutment received within the recess in order to capture the poppet piston within the fast fill piston.

25. The fast fill valve in accordance with the claim 24, wherein said radially extending abutment defines a shoulder engaged by said first resilient means.

26. The fast fill valve in accordance with claim 15, wherein the differential area piston includes compensation grooves disposed adjacent a radially interior part of said first seal.

27. The fast fill valve in accordance with claim 15, wherein the second enlarged diameter end of the differential area piston and the second end of the poppet piston are disposed within a fast fill chamber which communicates with said outlet.

28. The fast fill valve in accordance with claim 15, wherein the inlet communicates with a primary pressure chamber in said master cylinder.

29. A fast fill valve, comprising a valve housing having a stepped bore, the valve having a first bore end with an inlet receiving fluid pressure and a second bore end having a fluid pressure outlet, a differential area piston having a first reduced diameter end extending into the first bore end and a second enlarged diameter end extending into the second bore end, the piston having a through opening, the second enlarged diameter end of the piston having first and second seals disposed thereat, a poppet piston received in the through opening, the poppet piston including an aperture providing fluid flow therethrough, a first poppet end at an end opening in the reduced diameter end of the fast fill piston, and a second end at said second enlarged diameter end of the fast fill piston, first resilient means disposed between the pistons, and second resilient means biasing the poppet piston toward the first poppet end, wherein fluid pressure received at said inlet effects lateral movement of said pistons relative to one another.

30. The fast fill valve in accordance with claim 29, further comprising a third seal disposed at the first reduced diameter end of the differential area piston and about the first poppet end, the third seal effecting closure of said aperture when said poppet piston is in an at-rest position.

31. The fast fill valve in accordance with claim 29, wherein the second seal is received slidably and sealingly about the poppet piston.

32. The fast fill valve in accordance with claim 29, wherein the valve housing includes compensation grooves aligned with a radially peripheral portion of said second seal.

33. The fast fill valve in accordance with claim 29, wherein the valve housing is received within an outlet opening of a master cylinder, the outlet opening defining the first bore end.

34. The fast fill valve in accordance with claim 29, wherein the differential area piston includes compensation grooves disposed adjacent a radially interior part of said first seal.

35. The fast fill valve in accordance with claim 29, wherein an area between said seals comprises a variable volume chamber.

* * * * *